March 27, 1956 W. C. STEIN, SR 2,740,049
METHOD AND APPARATUS FOR DESTRUCTION OF LIVE YEAST CELLS IN BEER
Filed Sept. 3, 1952 4 Sheets-Sheet 4
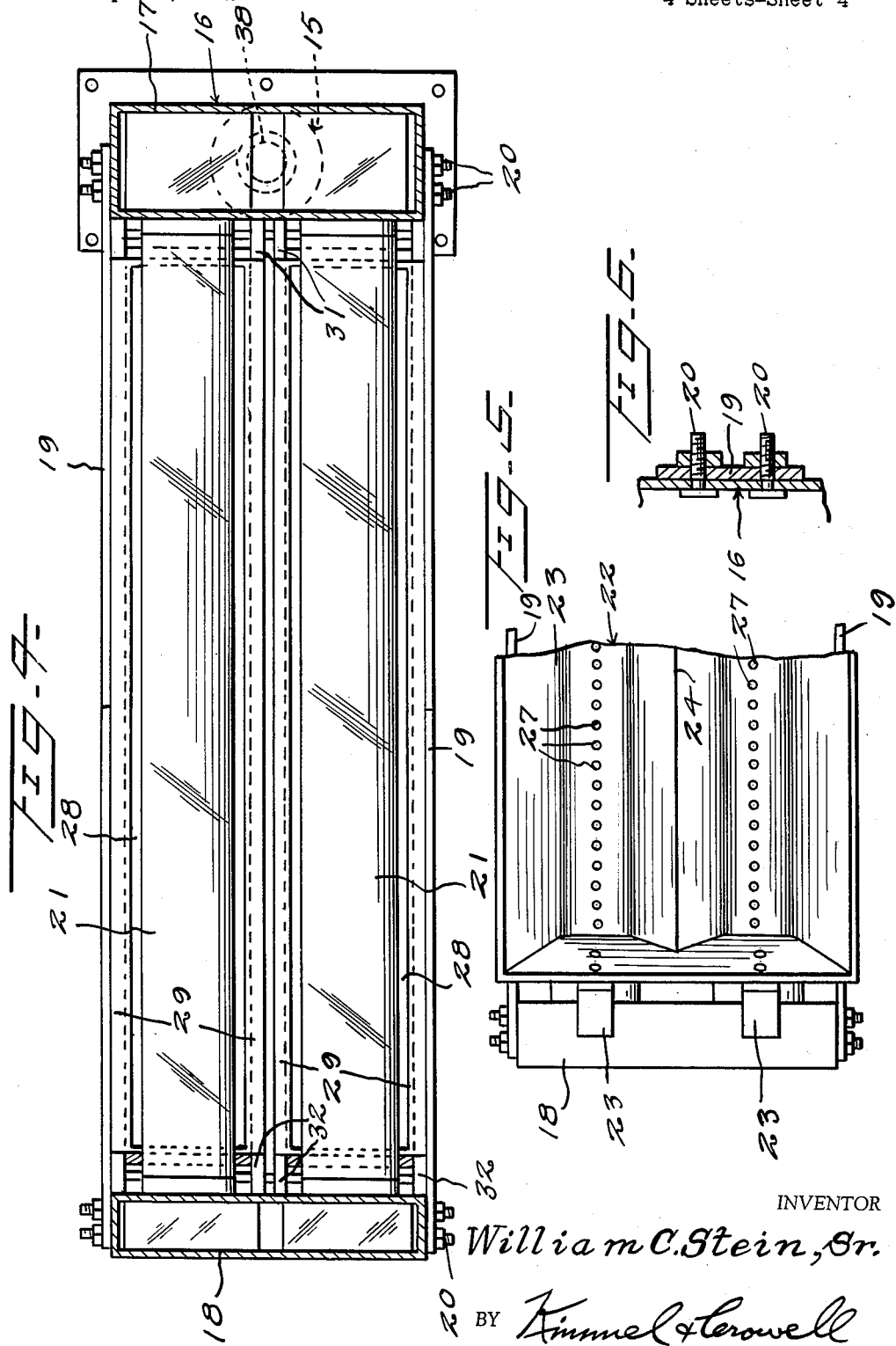
INVENTOR
William C. Stein, Sr.
BY Kimmel & Crowell
ATTORNEYS

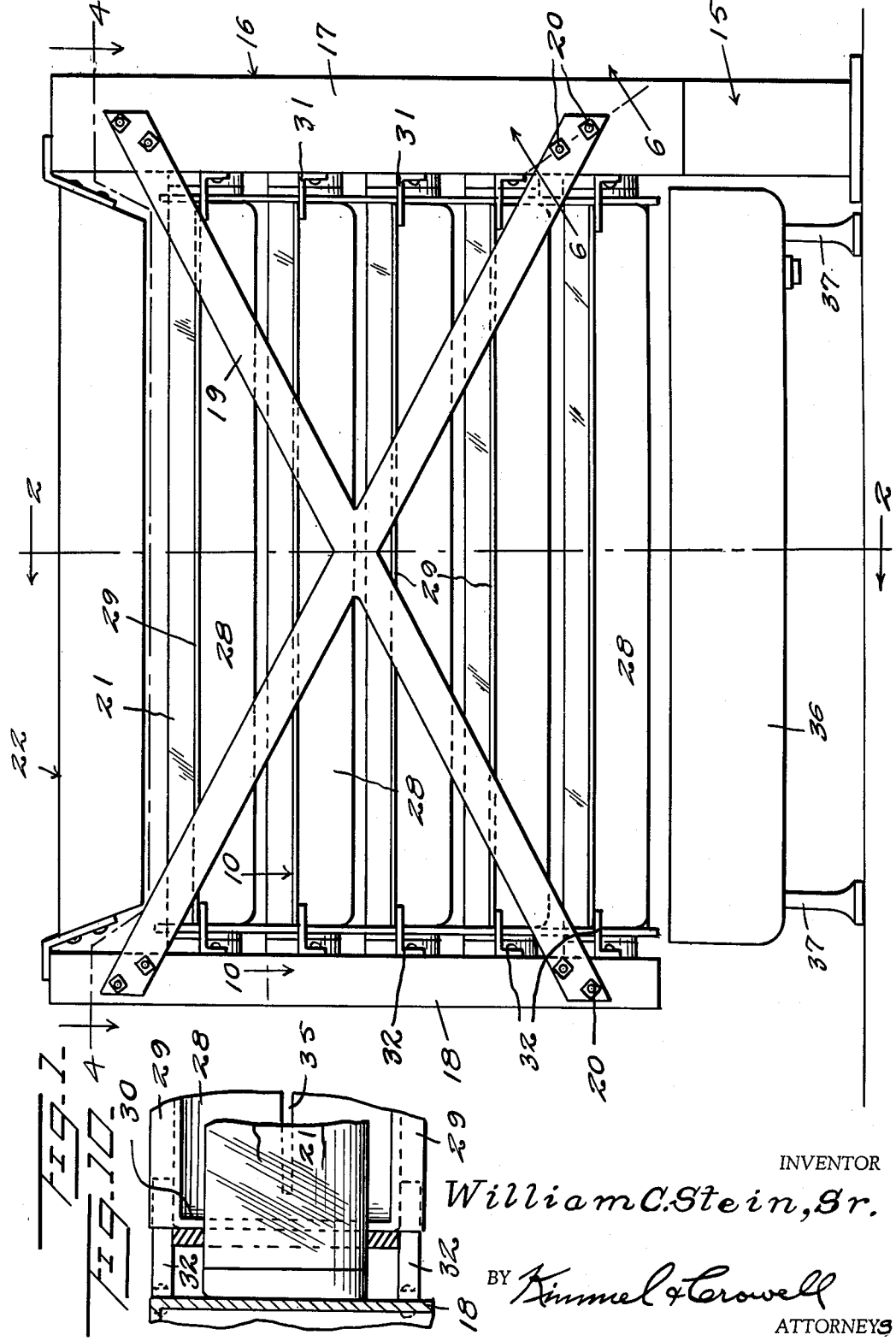

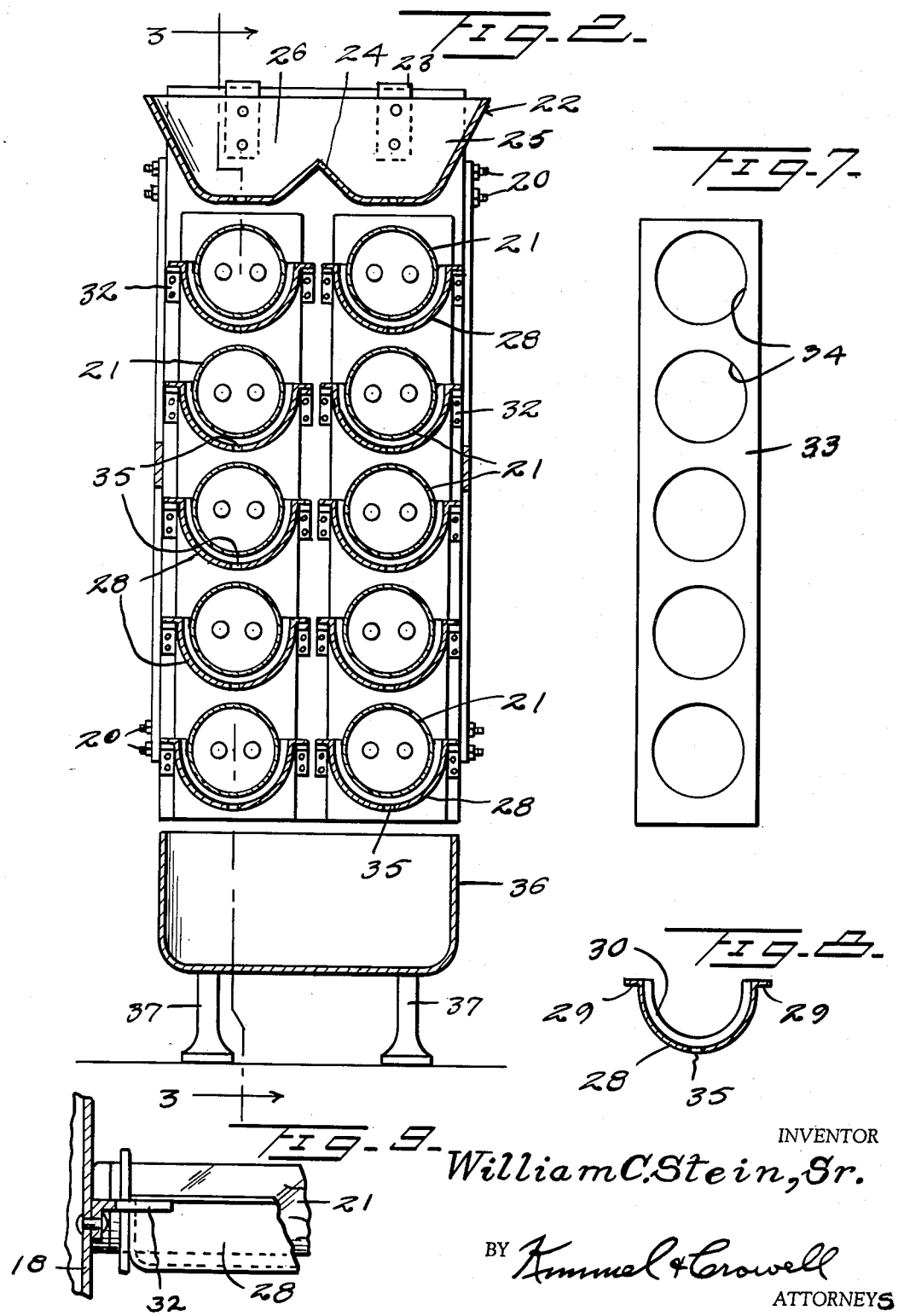

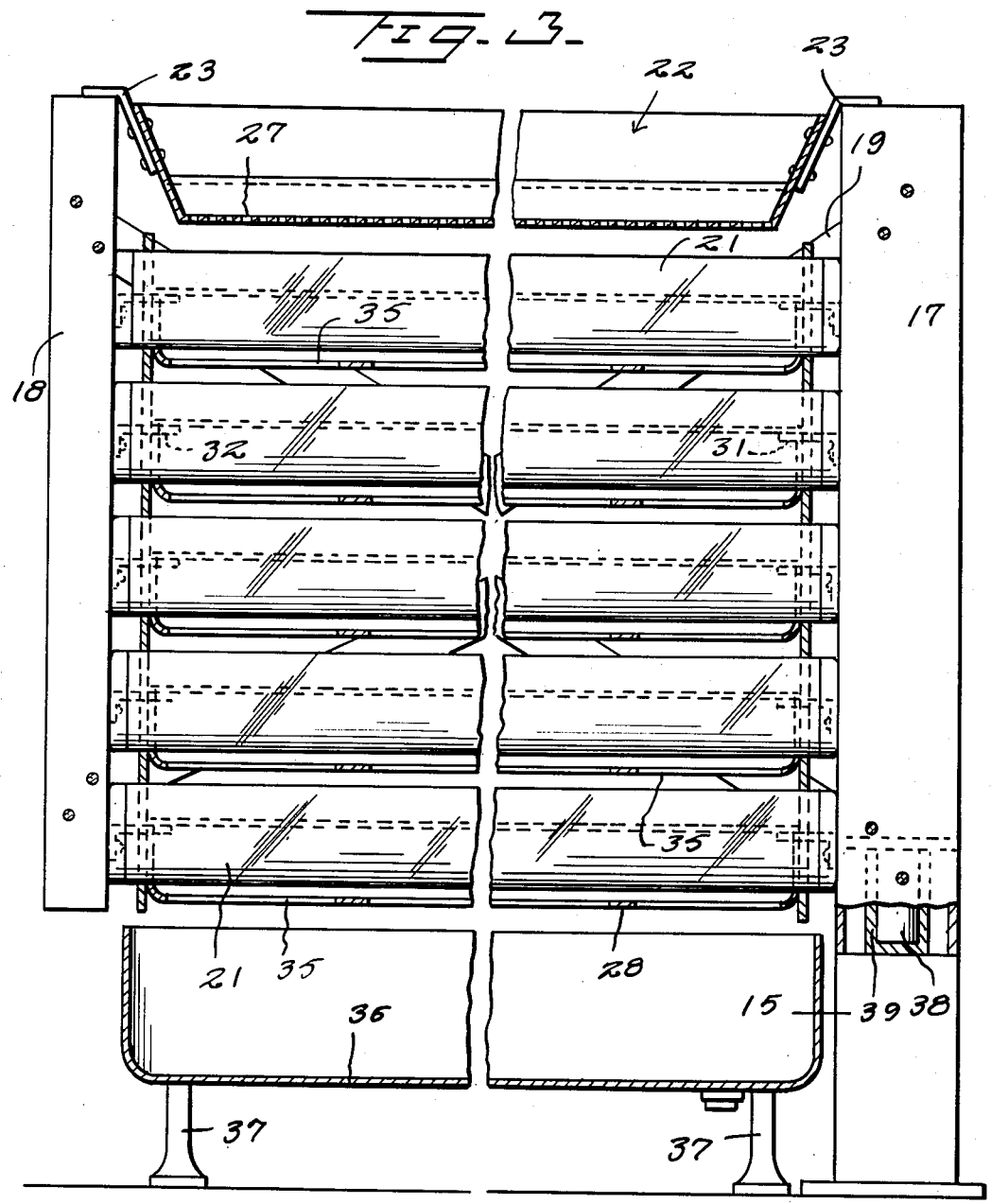

United States Patent Office 2,740,049
Patented Mar. 27, 1956

2,740,049

METHOD AND APPARATUS FOR DESTRUCTION OF LIVE YEAST CELLS IN BEER

William C. Stein, Sr., Buffalo, N. Y.

Application September 3, 1952, Serial No. 307,604

2 Claims. (Cl. 250—48)

This invention relates to a method and apparatus for destroying live yeast cells in beer.

An object of this invention is to provide a method of destroying live yeast cells in beer wherein the beer is cascaded over violet ray tubes.

Another object of this invention is to provide apparatus for destroying live yeast cells in beer which includes means for supporting a plurality of violet ray tubes in superposed relation, and means for cascading the beer over the tubes.

A further object of this invention is to provide apparatus for the purpose stated which will permit of the continuous treatment of the beer.

A further object of this invention is to provide apparatus of this kind which is simple in construction and capable of being maintained in a clean and sanitary condition.

A further object of this invention is to provide a method and apparatus whereby the beer will be subjected to a pre-carbonation pasteurization whereas under prior process the beer was pasteurized after carbonization.

A further object of this invention is to provide that after the beer has been treated as hereinbefore stated, that it be packaged in a conventional drinking glass.

I do not mean to confine myself to the exact details of construction herein disclosed, but claim all variations falling within the purview of the appended claims.

In the drawings:

Figure 1 is a detailed side elevation of a device for destroying live yeast cells in beer.

Figure 2 is a sectional view taken on the line 2—2 of Figure 1.

Figure 3 is a sectional view taken on the line 3—3 of Figure 2.

Figure 4 is a sectional view taken on the line 4—4 of Figure 1.

Figure 5 is a fragmentary top plan of the device.

Figure 6 is a fragmentary sectional view taken on the line 6—6 of Figure 1.

Figure 7 is a side elevation of one of the rubber sealing strips used with the device.

Figure 8 is a transverse sectional view of one of the guide troughs.

Figure 9 is a fragmentary vertical section showing the supporting means for the guide troughs.

Figure 10 is a fragmentary sectional view taken on the line 10—10 of Figure 1.

Referring to the drawings, the numeral 15 designates generally a base member, and the numeral 16 designates generally a supporting frame structure which is pivotally mounted on the base 15. The frame structure 16 includes a vertically disposed inner housing 17, a vertically disposed outer housing 18, and crossed bracing and supporting bars 19, which are fixed by fastening means 20 between the inner and outer housing members 17 and 18.

A plurality of superposed horizontally disposed violet ray tubes 21 are connected between the inner and outer housing members 17 and 18, and, in the present instance, there are two rows of violet ray tubes 21. An upper trough 22 is disposed above the upper one of the tubes 21 and is supported from the upper ends of the housing members 17 and 18 by means of brackets 23.

The trough 22, as shown in Figure 2, is formed with a longitudinally extending upwardly projected divider 24 which divides the trough 22 into a pair of chambers 25 and 26. The trough 22 is formed in the bottom of each chamber with a plurality of holes or openings 27 by means of which beer or other liquid may be discharged downwardly onto the upper ones of the violet ray tubes 21.

In order to provide a means for cascading the beer in a vertical path downwardly over the vertically aligned series of tubes 21, I have provided a transversely arcuate guide trough 28 disposed below each violet ray tube 21. The trough 28 is formed along the upper longitudinal edges thereof with outwardly projecting longitudinal flanges 29, and each trough 28 at each end thereof is formed with an end flange 30 adapted to closely engage about the tube 21.

Each trough 28 is supported between the vertical frames 17 and 18 by means of L-shaped bracket members 31 and 32, and the liquid is held against flowing over the end flanges 30 by means of vertically disposed rubber or flexible sealing strips 33. The sealing strips 33 are formed with openings 34 through which the violet ray tubes 21 snugly engage, and the sealing strips 33 are disposed in close sealing contact with the outer ends of the troughs 28.

Each trough 28 is provided with a plurality of aligned slots or openings 35 so that the liquid of each upper trough may drain into a succeeding lower trough. A collector 36 is disposed below the lower ones of the troughs 28 and is supported by means of supporting legs 37.

Inner frame member 17 is pivotally mounted on the base 15 by means of a pivot pin 38 which engages in a bearing socket 39 formed in the upper side of the base 15.

In the use and operation of this device, the beer or other liquid which is to be treated by the violet ray tubes is discharged into the upper trough 22. The beer or liquid will drain from trough 22 onto the upper one of the violet ray tubes 21, and the liquid will then cascade downwardly, flowing about each tube 21 and dropping into the associated trough 28 until the liquid finally reaches the collector 36.

I do not mean to confine myself to the exact details of construction herein disclosed, but claim all variations falling within the purview of the appended claims.

What is claimed is:

1. Apparatus for the treatment of beer comprising a base, a frame mounted on said base, said frame being formed of a pair of laterally spaced and substantially parallel side members and a pair of cross-brace members, each of said cross-brace members respectively, extending between and being connected to opposite sides of said pair of side members, a plurality of horizontally positioned vertically aligned ultra violet ray tubes extending between said upright members, an apertured trough beneath and partially surrounding each of said tubes, means carried by said upright members supporting said troughs, apertured end walls for said troughs, said tubes having their respective ends extending through said apertures, an upper trough above the upper one of said tubes, means supporting said upper trough on said frame, a collector disposed beneath the lower one of said tubes, and means pivotally mounting said frame on said base for swinging movement about a vertical axis to permit access to said lower trough.

2. Apparatus for the treatment of beer comprising a base, a frame mounted on said base, said frame including a pair of laterally spaced substantially parallel side members and a pair of cross-brace members, each of said cross-brace members respectively, extending between and being connected to opposite sides of said pair of members, a plurality of ultra violet ray tubes extending between said members, an apertured trough beneath and partially surrounding each tube, means carried by said members supporting said troughs on said frame, apertured end walls for said troughs, said tubes having their respective ends extending through said apertures, an upper trough disposed above the upper one of said tubes, means supporting said upper trough on said frame, a collector positioned beneath the lower one of said tubes, and means pivotally mounting said frame on said base for swinging movement about a vertical axis to permit access to said lower trough.

References Cited in the file of this patent
UNITED STATES PATENTS

| | | |
|---|---|---|
| 1,945,102 | Tranin et al. | Jan. 30, 1934 |
| 2,072,417 | Berndt et al. | Mar. 2, 1937 |
| 2,504,349 | Prieto | Apr. 18, 1950 |